(12) United States Patent
Park et al.

(10) Patent No.: US 9,179,419 B2
(45) Date of Patent: Nov. 3, 2015

(54) METHOD OF CONTROLLING UPLINK TRANSMISSION POWER AT UE IN WIRELESS COMMUNICATION SYSTEM AND APPARATUS THEREOF

(75) Inventors: Jonghyun Park, Anyang-si (KR); Inkwon Seo, Anyang-si (KR); Hyungtae Kim, Anyang-si (KR); Hanbyul Seo, Anyang-si (KR); Seungmin Lee, Anyang-si (KR); Kijun Kim, Anyang-si (KR); Youngseob Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 168 days.

(21) Appl. No.: 13/992,171

(22) PCT Filed: Feb. 2, 2012

(86) PCT No.: PCT/KR2012/000810
§ 371 (c)(1),
(2), (4) Date: Jun. 6, 2013

(87) PCT Pub. No.: WO2012/115632
PCT Pub. Date: Aug. 30, 2012

(65) Prior Publication Data
US 2013/0272158 A1    Oct. 17, 2013

Related U.S. Application Data

(60) Provisional application No. 61/445,534, filed on Feb. 22, 2011, provisional application No. 61/446,497, filed on Feb. 24, 2011.

(30) Foreign Application Priority Data

Jan. 16, 2012  (KR) .................. 10-2012-0004971

(51) Int. Cl.
| | | |
|---|---|---|
| H04L 12/801 | (2013.01) | |
| H04L 12/26 | (2006.01) | |
| H04W 52/02 | (2009.01) | |
| H04W 52/24 | (2009.01) | |
| H04B 7/04 | (2006.01) | |
| H04L 5/00 | (2006.01) | |

(Continued)

(52) U.S. Cl.
CPC .......... *H04W 52/242* (2013.01); *H04B 7/0417* (2013.01); *H04L 5/0023* (2013.01);
(Continued)

(58) Field of Classification Search
CPC ....... H04L 47/10; H04L 43/50; H04W 52/02; H04W 52/0216
USPC .................................. 370/252, 311
See application file for complete search history.

(56) References Cited

U.S. PATENT DOCUMENTS

| | | |
|---|---|---|
| 2010/0285792 A1 | 11/2010 | Chen et al. |
| 2011/0038302 A1 | 2/2011 | Papasakellariou et al. |
| 2013/0051240 A1* | 2/2013 | Bhattad et al. ............ 370/241 |

FOREIGN PATENT DOCUMENTS

| | | |
|---|---|---|
| CN | 101399579 A | 4/2009 |
| CN | 101741437 A | 6/2010 |

(Continued)

OTHER PUBLICATIONS

Nokia: "Multi-cell CSI-RS design aspects", 3GPP TSG-RAN WG1 Meeting #58bis, R1-093909, Oct. 12-16, 2009.

*Primary Examiner* — Ronald B Abelson
(74) *Attorney, Agent, or Firm* — Dentons US LLP

(57) ABSTRACT

A method of determining uplink transmission power at a user equipment (UE) in a wireless communication system is disclosed. The method includes receiving channel status information-reference signal (CSI-RS) settings and downlink transmission power values for a plurality of transmission points (TPs) from a higher layer, receiving CSI-RSs from the plurality of TPs, estimating path loss values corresponding to the plurality of TPs based on the received CSI-RSs, determining the uplink transmission power using the estimated path loss values, and transmitting an uplink signal to one or more of the plurality of TPs based upon the determined uplink transmission power.

14 Claims, 11 Drawing Sheets

(51) Int. Cl.
  *H04L 25/02* (2006.01)
  *H04W 52/14* (2009.01)
  *H04W 52/40* (2009.01)

(52) U.S. Cl.
  CPC ............ *H04L5/0048* (2013.01); *H04L 5/0057* (2013.01); *H04L 5/005* (2013.01); *H04L 5/0007* (2013.01); *H04L 5/0051* (2013.01); *H04L 25/0224* (2013.01); *H04W 52/146* (2013.01); *H04W 52/40* (2013.01)

(56) References Cited

FOREIGN PATENT DOCUMENTS

| | | |
|---|---|---|
| JP | 2009296664 A | 12/2009 |
| KR | 10-2009-0088086 | 8/2009 |
| KR | 10-2010-0105347 | 9/2010 |
| KR | 10-2010-0112329 | 10/2010 |
| WO | 2010035966 A2 | 4/2010 |

* cited by examiner

-- RELATED ART --

(a) CONTROL-PLANE PROTOCOL STACK (b) USER-PLANE PROTOCOL STACK

METHOD OF CONTROLLING UPLINK TRANSMISSION POWER AT UE IN WIRELESS COMMUNICATION SYSTEM AND APPARATUS THEREOF

This Application is a 35 U.S.C. §371 National Stage Entry of International Application No. PCT/KR2012/000810, filed Feb. 2, 2012, and claims the benefit of U.S. Provisional Application Nos. 61/445,534, filed Feb. 22, 2011 and 61/446,497, filed Feb. 24, 2011; and Korean Patent Application No. 10-2012-0004971, filed Jan. 16, 2012, all of which are incorporated by reference in their entirety herein.

TECHNICAL FIELD

The present invention relates to a wireless communication system, and more particularly, to a method of controlling uplink transmission power at a user equipment (UE) in a wireless communication system and an apparatus thereof.

BACKGROUND ART

As an example of a mobile communication system to which the present invention is applicable, a 3rd Generation Partnership Project (3GPP) Long Term Evolution (LTE) communication system will be briefly described.

FIG. 1 is a diagram showing a network structure of an Evolved Universal Mobile Telecommunications System (E-UMTS) as an example of a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARM)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other wireless access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE OF INVENTION

Technical Problem

An object of the present invention devised to solve the problem lies in a method of controlling uplink transmission power at a UE in a wireless communication system and an apparatus thereof.

Solution to Problem

The object of the present invention can be achieved by providing a method of determining uplink transmission power at a user equipment (UE) in a wireless communication system, the method including receiving channel status information-reference signal (CSI-RS) settings and downlink transmission power values for a plurality of transmission points (TPs) from a higher layer, receiving CSI-RSs from the plurality of TPs, estimating path loss values corresponding to the plurality of TPs based on the received CSI-RSs, determining the uplink transmission power using the estimated path loss values, and transmitting an uplink signal to one or more of the plurality of TPs based upon the determined uplink transmission power.

The CSI-RSs for the plurality of TPs may be defined by different antenna ports, and the downlink transmission power values for the plurality of transmission points may correspond to the defined antenna ports.

Determining the uplink transmission power may include determining the uplink transmission power according to a smallest path loss value among the estimated path loss values or determining the uplink transmission power according to an average of the estimated path loss values.

The plurality of TPs may have the same cell identifier.

The plurality of TPs may transmit the same cell-specific RS to the UE.

The CSI-RS settings may include an indicator indicating whether the CSI-RSs are used for path loss value estimation in addition to channel status information feedback.

In another aspect of the present invention, provided herein is a user equipment (UE) in a wireless communication system, including a reception module configured to receive channel status information-reference signal (CSI-RS) settings and downlink transmission power values for a plurality of transmission points (TPs) from a higher layer and receive CSI-RSs from the plurality of TPs, a processor configured to estimate path loss values corresponding to the plurality of TPs based on the received CSI-RSs and determine uplink transmission power using the estimated path loss values, and a transmission module configured to transmit an uplink signal to one or more of the plurality of TPs based upon the determined uplink transmission power.

The processor may determine the uplink transmission power according to a smallest path loss value among the estimated path loss values or determines the uplink transmission power according to an average of the estimated path loss values.

Advantageous Effects of Invention

According to the embodiments of the present invention, it is possible to efficiently control uplink transmission power at a UE in a wireless communication system.

The effects of the present invention are not limited to the above-described effects and other effects which are not described herein will become apparent to those skilled in the art from the following description.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

The configuration, operation and other features of the present invention will be understood by the embodiments of the present invention described with reference to the accompanying drawings. The following embodiments are examples of applying the technical features of the present invention to a $3^{rd}$ Generation Partnership Project (3GPP) system.

Although the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

Figure 1:
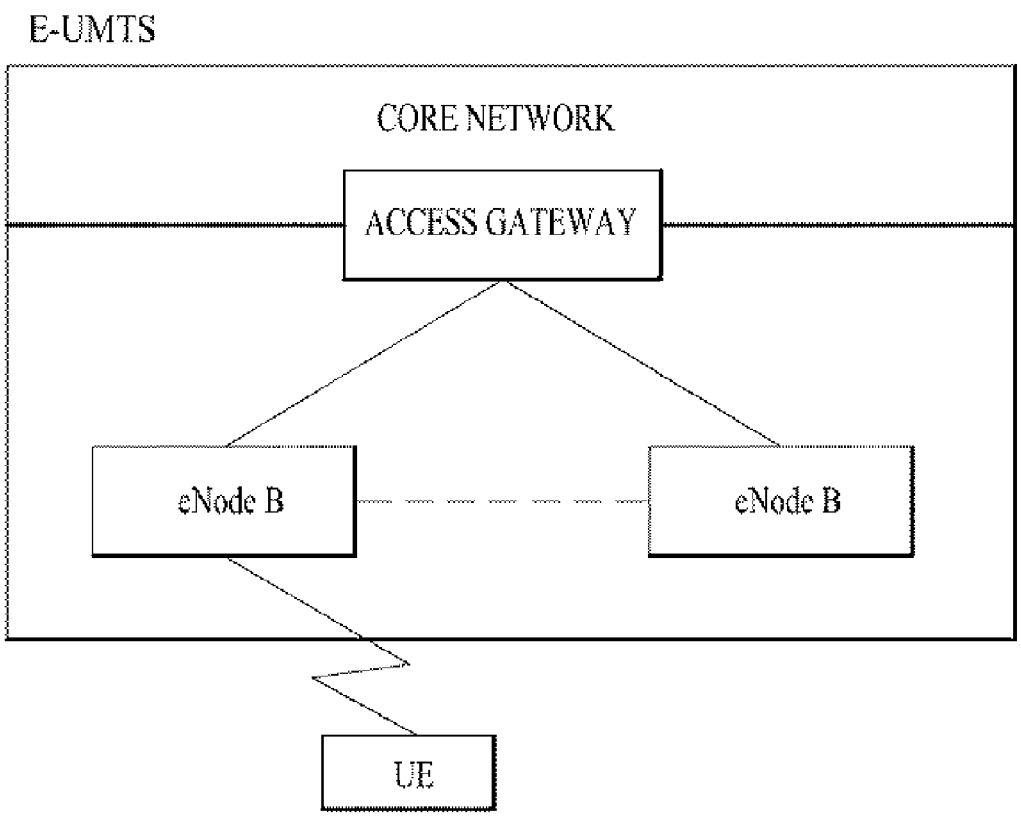
FIG. 1 is a diagram showing a network structure of an Evolved Universal Mobile Telecommunications System (E-UMTS) as an example of a wireless communication system.
Figure 2:
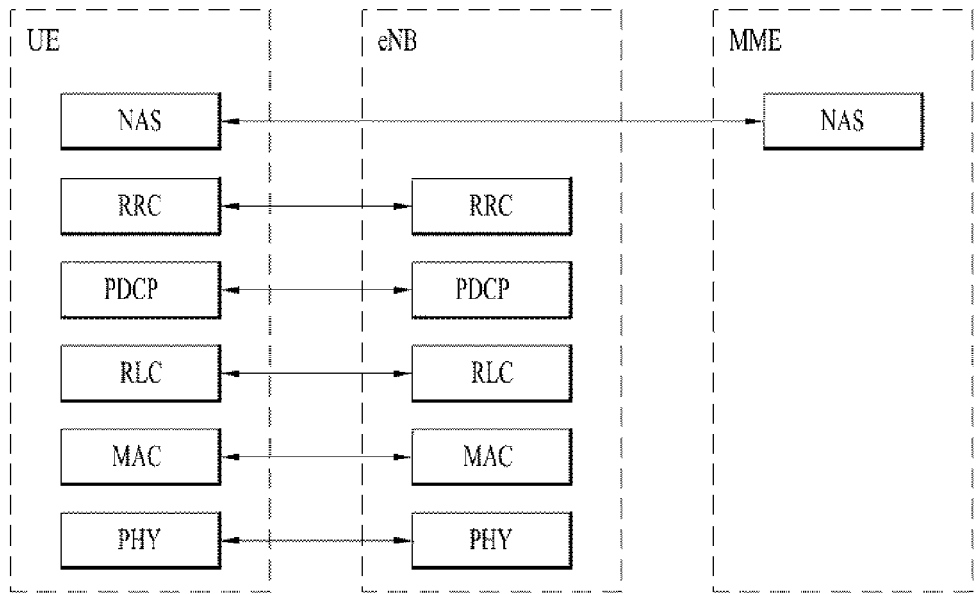
FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.
Figure 2:
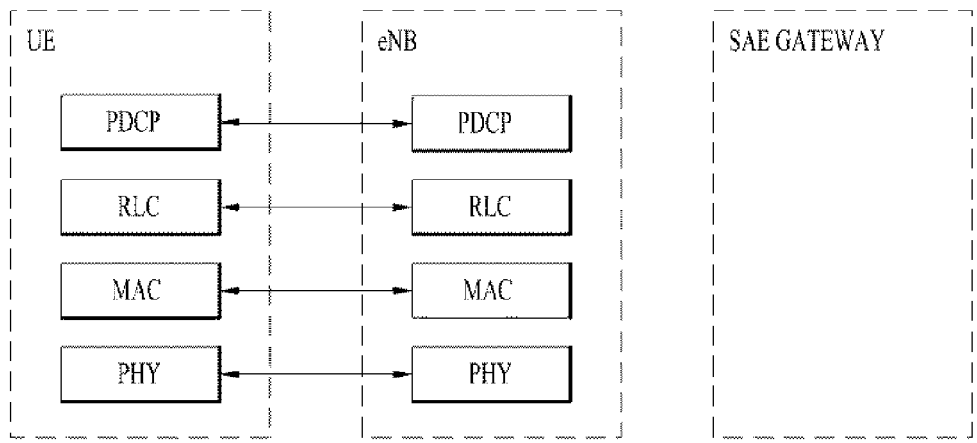

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
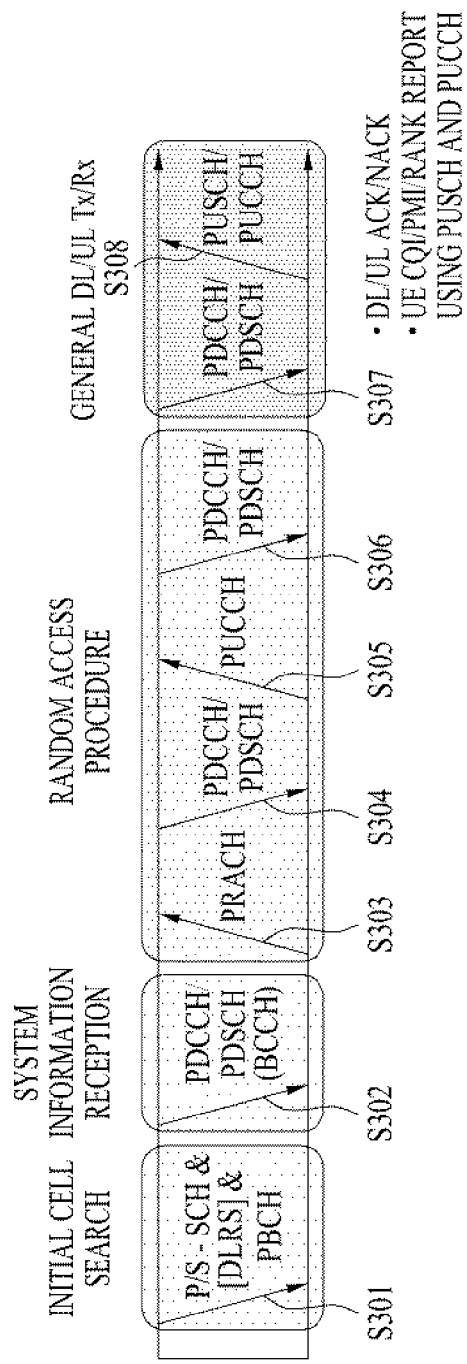
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel status in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303), and receive a response message of the preamble through the PDCCH and the PDSCH corresponding thereto (S304). In the case of contention-based RACH, a contention resolution procedure may be further performed.

The UE which performs the above procedures may perform PDCCH/PDSCH reception (S307) and Physical Uplink Shared Channel (PUSCH)/Physical Uplink Control Channel (PUCCH) transmission (S308) as a general uplink/downlink signal transmission procedure. In particular, the UE receives downlink control information (DCI) through a PDCCH. The DCI includes control information such as resource allocation information of the UE and the format thereof varies according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
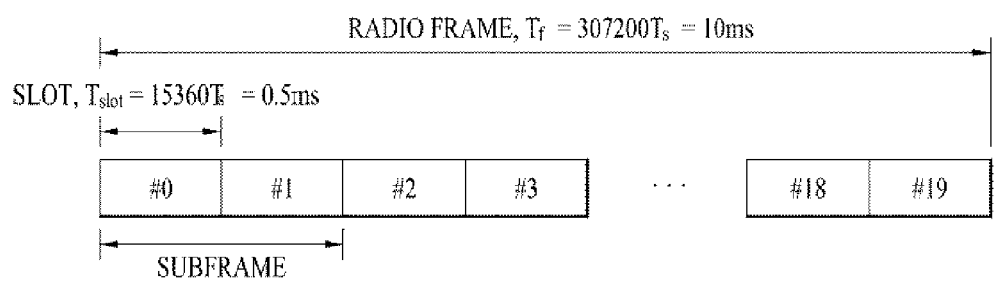
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms (327200*$T_s$) and includes 10 subframes with the same size. Each of the subframes has a length of 1 ms and includes two slots. Each of the slots has a length of 0.5 ms (15360*$T_s$). $T_s$ denotes a sampling time, and is represented by $T_s=1/(15 \text{ kHz}*2048)=3.2552*10-8$ (about 33 ns). Each slot includes a plurality of OFDM symbols in a time domain, and includes a plurality of resource blocks (RBs) in a frequency domain. In the LTE system, one RB includes 12 subcarriers*7(6) OFDM symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Figure 5:
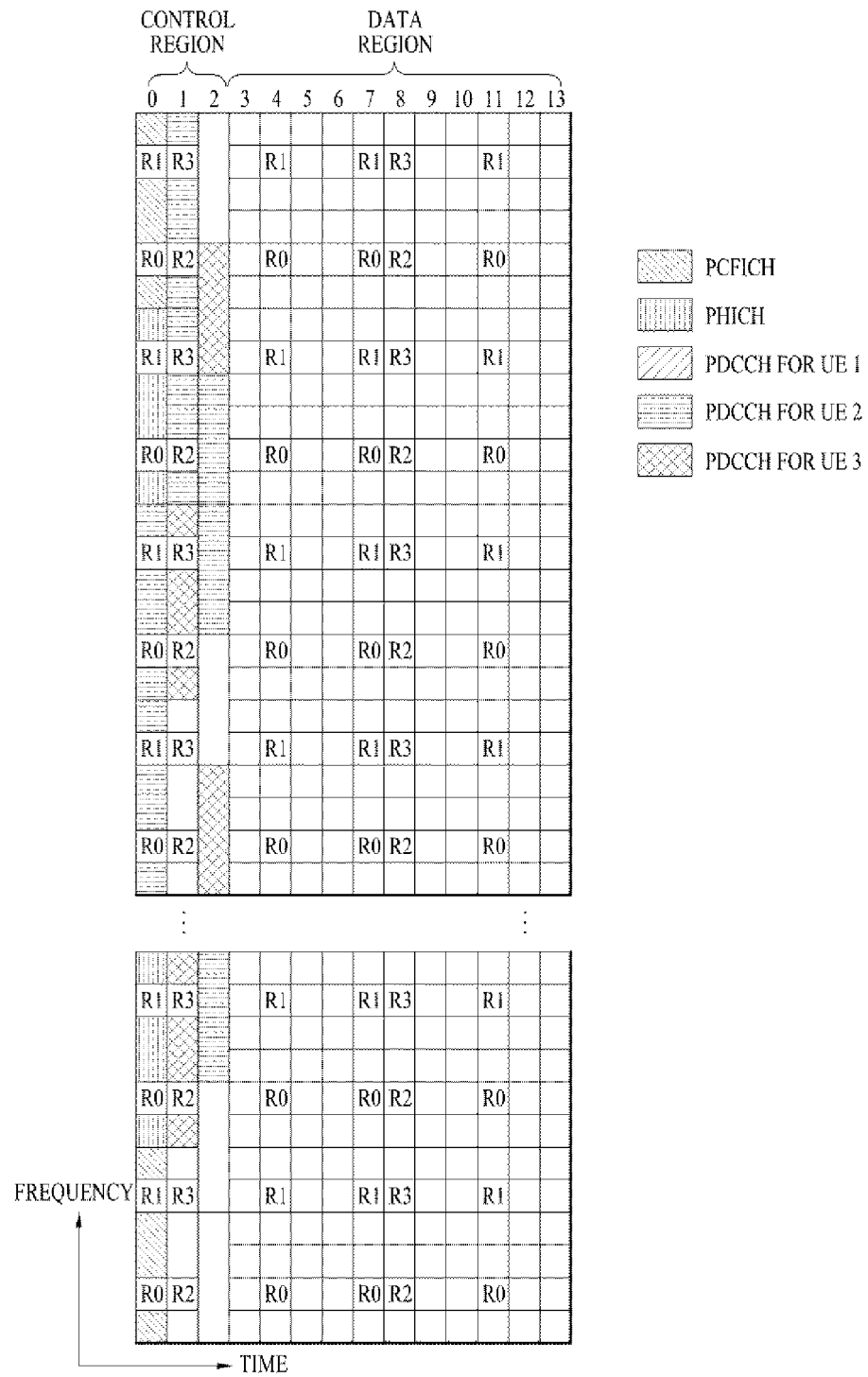
FIG. 5 is a diagram showing the structure of a downlink radio subframe in an LTE system.

FIG. 5 is a diagram showing a control channel included in a control region of one subframe in a downlink radio frame.

Referring to FIG. 5, a subframe includes 14 OFDM symbols. The first to third OFDM symbols are used as a control region and the remaining 13 to 11 OFDM symbols are used as a data region, according to subframe settings. In FIG. 5, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The PCFICH informs the UE of the number of OFDM symbols used for the PDCCH per subframe. The PCFICH is located at a first OFDM symbol and is set prior to the PHICH and the PDCCH. The PCFICH includes four Resource Element Groups (REGs) and the REGs are dispersed in the control region based on a cell identity (ID). One REG includes four resource elements (REs). The RE denotes minimum physical resources defined as one subcarrier?one OFDM symbol. The PCFICH value indicates a value of 1 to 3 or 2 to 4 according to bandwidth and is modulated using a Quadrature Phase Shift Keying (QPSK) scheme.

The PHICH is used to carry HARQ ACK/NACK for uplink transmission. That is, the PHICH denotes a channel through which DL ACK/NACK information for UL HARQ is transmitted. The PHICH includes one REG and is scrambled on a cell-specific basis. ACK/NACK is indicated by one bit and is modulated using a Binary Phase Shift Keying (BPSK) scheme. The modulated ACK/NACK is spread with a spreading factor (SF) of 2 or 4. A plurality of PHICHs mapped to the same resources configures a PHICH group. The number of PHICHs multiplexed in the PHICH group is determined according to the number of SFs. The PHICH (group) is repeated three times in order to obtain diversity gain in the frequency domain and/or the time domain.

The PDCCH is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The PCH and the DL-SCH are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the data is transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and a DCI format, that is, transmission format information (e.g., transmission block size, modulation scheme, coding information, or the like) "C" is transmitted via a specific subframe. In this case, a UE located within a cell monitors a PDCCH using its own RNTI information, and if one or more UEs having "A" RNTI are present, the UEs receive the PDCCH and receive the PDSCH indicated by "B" and "C" through the information about the received PDCCH.

Figure 6:
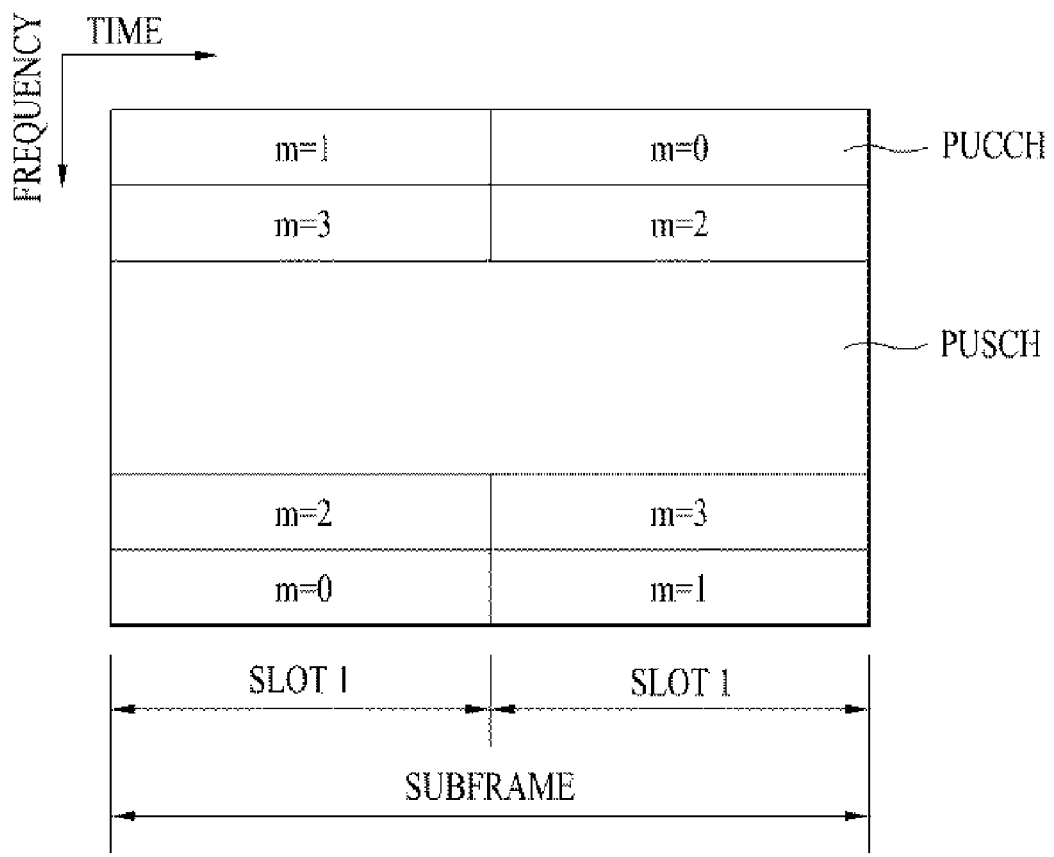
FIG. 6 is a diagram showing the structure of an uplink subframe in an LTE system.

FIG. 6 is a diagram showing the structure of an uplink subframe used in an LTE system.

Referring to FIG. 6, an uplink subframe may be divided into a region to which a Physical Uplink Control Channel (PUCCH) carrying uplink control information is allocated and a region to which a Physical Uplink Shared Channel (PUSCH) carrying user data is allocated. A middle portion of the subframe is allocated to the PUSCH and both sides of a data region in a frequency domain are allocated to the PUCCH. Uplink control information transmitted on the PUCCH includes an ACK/NACK signal used for HARQ, a Channel Quality Indicator (CQI) indicating a downlink channel status, a rank indicator (RI) for MIMO, a scheduling request (SR) which is an uplink radio resource allocation request, etc. The PUCCH for one UE uses one resource block occupying different frequencies in slots within the subframe. Two slots use different resource blocks (or subcarriers) within the subframe. That is, two resource blocks allocated to the PUCCH are frequency-hopped in a slot boundary. FIG. 6 shows the case in which a PUCCH having m=0, a PUCCH having m=1, a PUCCH having m=2, and a PUCCH having m=3 are allocated to the subframe.

Hereinafter, a reference signal (RS) will be described.

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

Recently, in most mobile communication systems, when packets are transmitted, a method for improving data transmission/reception efficiency using multiple transmission antennas and multiple reception antennas has been used, unlike the related art using one transmission antenna and one reception antenna. In the case in which the transmitter or the receiver uses multiple antennas so as to increase capacity or improve performance, in order to accurately receive the signal, the channel statuses between the transmission antennas and the reception antennas should be acquired from the respective RSs of the transmission antennas.

In a wireless communication system, RSs may be largely divided into two RSs according to their purposes: a RS for acquiring channel information and an RS used for data demodulation. The former is used for enabling a User Equipment (UE) to acquire downlink channel information, and thus should be transmitted in a wideband. Accordingly, even a UE which does not downlink data in a specific subframe should receive this RS and perform channel measurement. In addition, this RS is also used for measurement for mobility management such as handover or the like.

The latter is an RS which is sent together when a base station (eNB) sends downlink data. The UE may receive this RS so as to perform channel estimation and demodulate the data. This RS should be transmitted in a region in which data is transmitted.

In an LTE system, two downlink RSs are defined for a unicast service. More specifically, there are a common RS (CRS) for measurement associated with handover and channel status information acquisition and a dedicated RS (DRS) used for data demodulation. The CRS may be referred to as a cell-specific RS and the DRS may be referred to as a UE-specific RS.

In an LTE system, the DRS is used only for data demodulation and the CRS is used for channel information acquisition and data demodulation. This CRS is transmitted in every subframe over a wideband as a cell-specific RS. In addition, the CRS is transmitted based on a maximum of four antenna ports according to the number of transmission antennas. For example, if the number of transmission antennas of a base station is two, CRSs for antenna ports 0 and 1 are transmitted and, if the number of transmission antennas is four, CRSs for antenna ports 0 to 3 are transmitted.

Figure 7:
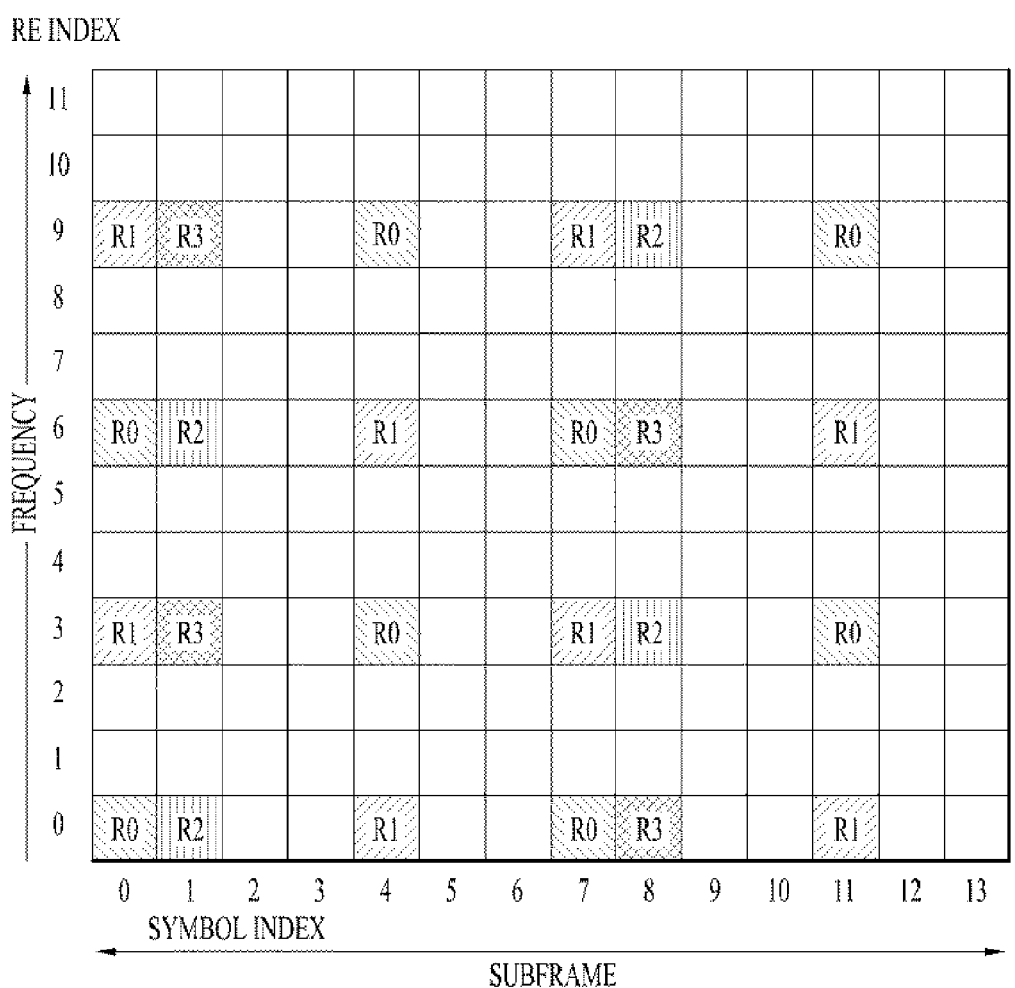
FIG. 7 is a diagram showing a general CRS pattern in the case in which the number of transmission antenna ports is 4 in an LTE system.

FIG. 7 is a diagram showing a general CRS pattern in the case in which the number of transmission antenna ports is 4 in an LTE system.

Referring to FIG. 7, if CRSs are mapped to time-frequency resources in the LTE system, an RS for one antenna port on a frequency axis is transmitted in a state of being mapped to one RE among 6 REs. Since one RB includes 12 REs on the frequency axis, two REs of one RB are used as REs for one antenna port.

Figure 8:
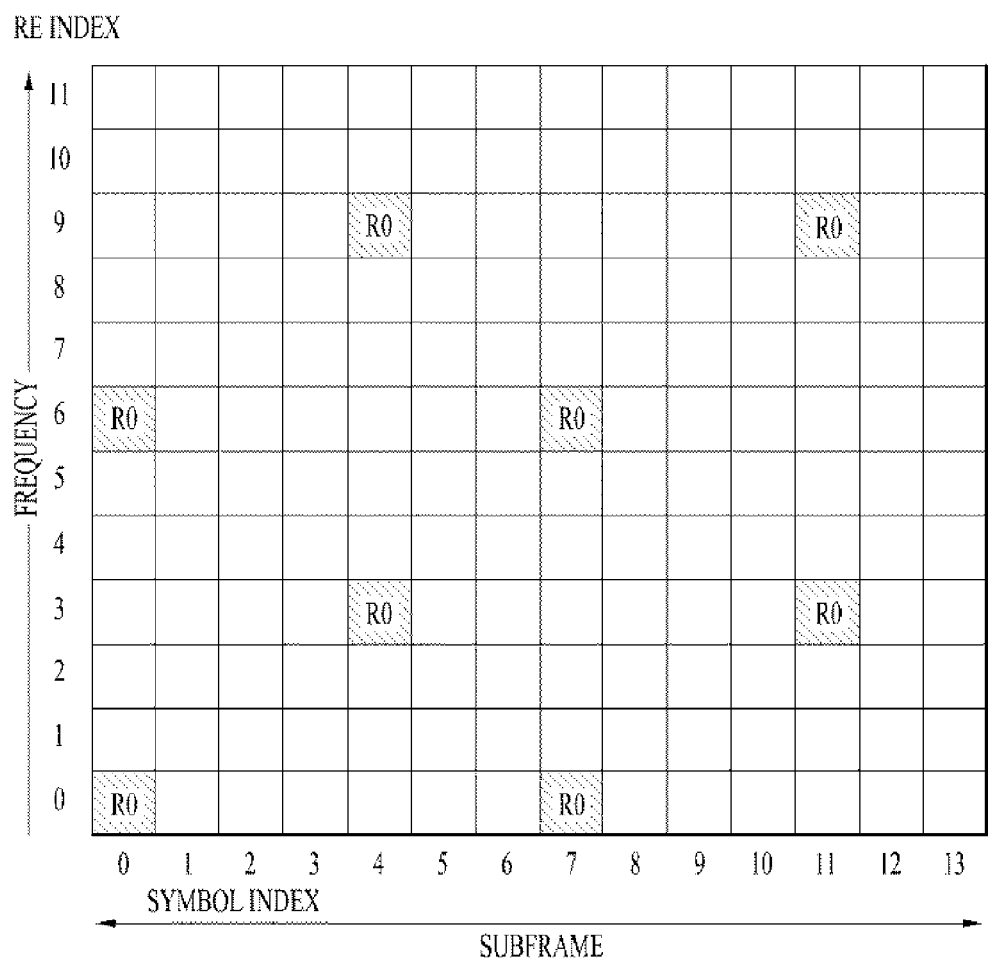
FIG. 8 is a diagram showing a CRS pattern for a transmission antenna port 0 in an LTE system.

FIG. 8 is a diagram showing a CRS pattern for a transmission antenna port 0 in an LTE system.

In an LTE-A system, an evolved form of the LTE system, a base station (eNB) should be designed to support a maximum of eight transmission antennas in downlink. Accordingly, RS transmission for a maximum of eight transmission antennas should also be supported.

More specifically, since only RSs for a maximum of four antenna ports are defined as downlink RSs in the LTE system, if an eNB has four to eight downlink transmission antennas in the LTE-A system, RSs for these antennas should be additionally defined. RSs for channel measurement and RSs for data demodulation should be designed as the RSs for a maximum of eight transmission antenna ports.

One important consideration in design of the LTE-A system is backward compatibility. That is, an LTE UE should operate well even in the LTE-A system and the LTE-A system should support the LTE UE. In terms of RS transmission, in a time-frequency domain in which CRSs defined in the LTE system are transmitted, RSs for a maximum of eight transmission antenna ports should be additionally defined. However, in the LTE-A system, if an RS pattern for a maximum of eight transmission antennas is added to the entire band per subframe using the same method as the CRS of the conventional LTE system, overhead is excessively increased.

Accordingly, RSs newly designed in the LTE-A system are roughly divided into two types: a channel measurement RS (Channel Status Information-RS (CSI-RS)) for selecting an MCS, a Precoding Matrix Indicator (PMI) or the like and a Demodulation RS (DM-RS) for demodulation of data transmitted via eight transmission antennas.

The CSI-RS is used only for channel measurement, whereas the existing CRS is used for channel measurement, handover measurement or data demodulation. Since the CSI-RS is transmitted to acquire channel status information, the CSI-RS may not be transmitted per subframe, unlike the CRS. Currently, in the LTE-A standard, CSI-RSs may be allocated to antenna ports 15 to 22 and CSI-RS setting information is defined to be received through higher layer signaling.

In addition, for data demodulation, a DM-RS is transmitted to a UE scheduled in a corresponding time-frequency domain as a DRS. That is, the DM-RS transmitted to a specific UE is transmitted only in a domain scheduled to the UE, that is, in a time-frequency domain in which the UE receives data.

Hereinafter, uplink transmission power control will be described.

In a wireless communication system, a UE periodically measures an Rx signal level and signal quality of a serving cell to which the UE belongs. Information about the measured signal level and/or signal quality is variously used and may be particularly used to determine power (hereinafter, referred to as "uplink transmission power") output from a UE for uplink.

Uplink transmission power control is a fundamental factor of a wireless communication system. The object of uplink transmission power is to control the level of the received signal at the eNB to an appropriate level. By maintaining the level of the received signal at the appropriate level, it is possible to prevent unnecessary power consumption of the UE and adaptively determine a data transfer rate, etc. so as to improve transmission efficiency.

In general, uplink transmission power control includes two factors: open loop power control and closed loop power control. The former includes a part for measuring or estimating downlink signal attenuation and predicting uplink signal attenuation to compensate for uplink transmission power and a part for determining uplink transmission power in consideration of the amount of radio resources allocated to a UE or the attributes of transmitted data. The latter includes a part for controlling uplink transmission power using information included in a closed loop power control message received from an eNB.

$$P(i) = \min\{P_{MAX}, \alpha \times PL + A(i) + f(i)\} \text{ [dBm]} \quad \text{<Equation 1>}$$

Equation 1 shows a method of determining uplink transmission power according to such a method. Here, P(i) denotes uplink transmission power of an i-th time and PMAX denotes maximum transmission power of a UE. PL denotes a path loss estimation value of a downlink signal, ? and A(i) denote parameters given by the attributes of a higher layer signal and transmitted data at an i-th time and the amount of allocated resources. These parameters are parameters for open loop power control.

In addition, f(i) denotes a power control value of an i-th time determined by information included in a closed loop power control message from an eNB and is a parameter for closed loop power control.

A main object of open loop power control is to control the level of a signal transmitted from a UE, that is, uplink transmission power, to an appropriate level by using an estimated or computed downlink signal attenuation degree on the assumption that an uplink signal attenuation degree matches a downlink signal attenuation degree. The level of the appropriate transmitted signal is determined by the parameter A(i).

The object of closed loop power control corresponding to the parameter f(i) of Equation 1 is to compensate for channel fading varying in time scale faster than average signal attenuation and non-matching in signal attenuation between uplink and downlink.

That is, an open loop power control parameter is a factor for controlling power by estimating and compensating for attenuation of a downlink signal from an eNB of a cell to which a UE belongs. For example, if a distance between a UE and an eNB connected to the UE is large and thus downlink signal attenuation is large, uplink transmission power is increased. The closed loop power control parameter controls uplink transmission power by directly delivering information (control signal) necessary for controlling uplink transmission power by an eNB.

Meanwhile, in an LTE-A system which is a next-generation mobile communication system, in order to improve a data transfer rate, a Coordinated Multi Point (CoMP) transmission scheme which was not supported in the conventional standard will be supported. Here, the CoMP transmission scheme refers to a transmission scheme for performing communication with a UE by coordination between two or more eNBs or cells in order to improve communication performance between a UE located in a shadow region and an eNB (cell or sector).

The CoMP transmission scheme may be divided into a cooperative MIMO-based Joint Processing (JP) scheme through data sharing and a CoMP-Coordinated Scheduling/Coordinated Beamforming (CoMP-CS/CB) scheme.

In case of downlink, in the CoMP-JP scheme, a UE may instantaneously and simultaneously receive data from eNBs, each of which implement a CoMP transmission scheme, and combine the signals received from the eNBs so as to improve reception performance (Joint Transmission (JT)). In addition, a method of transmitting data from one of eNBs, each of which performs a CoMP transmission scheme, to a UE at a specific time may be considered (Dynamic Point Selection (DPS)). In the CoMP-CS/CB scheme, a UE may instantaneously receive data from one eNB, that is, a serving eNB, through beamforming.

In case of uplink, in the CoMP-JP scheme, eNBs may simultaneously receive a PUSCH signal from a UE (Joint Reception (JR)). In the CoMP-CS/CB scheme, only one eNB receives a PUSCH. At this time, a determination as to whether a CoMP/CS-CB scheme is used is made by coordinated cells (or eNBs).

Meanwhile, the CoMP scheme is applicable to a heterogeneous network as well as a homogeneous network including only a macro eNB.

Figure 9:
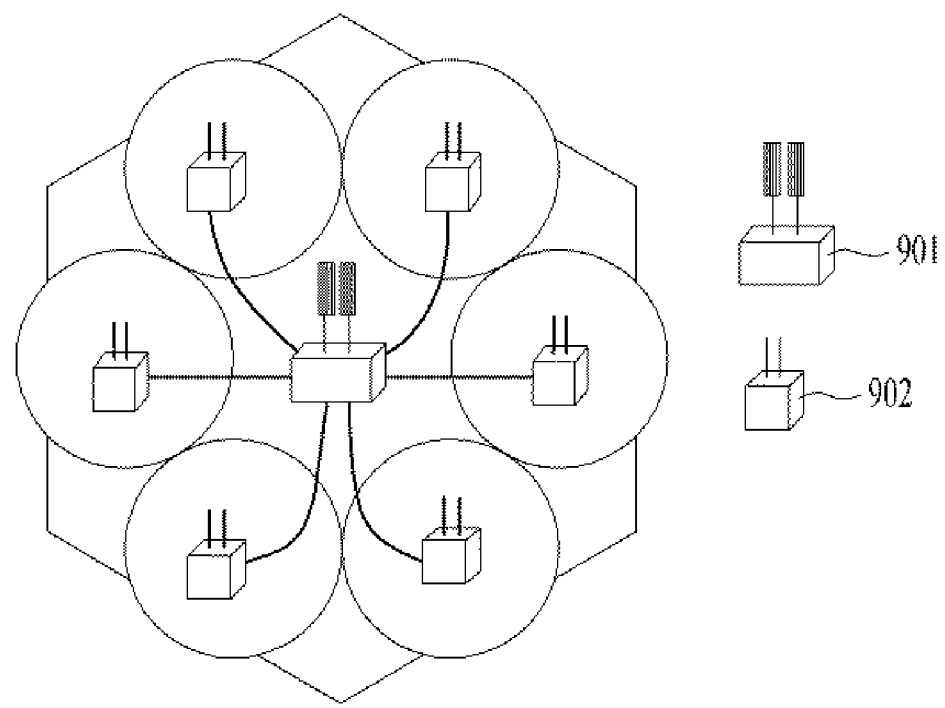
FIG. 9 is a diagram showing the configuration of a heterogeneous network to which a CoMP scheme is applied.

FIG. 9 is a diagram showing the configuration of a heterogeneous network to which a CoMP scheme is applied. In particular, FIG. 9 shows a network including a macro eNB 901 and radio remote heads (RRHs) 902 for transmitting and receiving a signal with a relatively low transmission power. A pico eNB or RRH located in a coverage of the macro eNB may be connected to the macro eNB via an optical cable, etc. In addition, the RRH may also be referred to as a micro eNB.

Referring to FIG. 9, since transmission power of the micro eNB such as the RRH is relatively lower than that of the macro eNB, it can be seen that the coverage of each RRH is relatively smaller than that of the macro eNB.

In such a CoMP scenario, as compared to a system in which only a macro eNB is present, a coverage hole of a specific region is covered through added RRHs or a plurality of transmission points (TPs) including RRHs and a macro eNB is used, thereby increasing overall system throughput through cooperative transmission.

Meanwhile, in FIG. 9, RRHs may be classified into two cases: the case in which all RRHs are allocated cell identifiers (IDs) different from that of a macro eNB and are regarded as small cells and the case in which all RRHs have the same cell ID as a macro eNB.

In the case in which the RRHs are allocated cell IDs different from the macro eNB, the UE recognizes the RRHs as independent cells. A UE located at the boundary of each cell receives severe interference from a neighboring cell. Various CoMP schemes for reducing such interference and increasing transfer rate have been proposed.

Next, in the case in which the RRHs are allocated the same cell ID as the macro eNB, as described above, the UE recognizes the RRHs and the macro eNB as one cell. The UE receives data from each RRH and the macro eNB. In case of a data channel, precoding used for data transmission of each UE is simultaneously applied to an RS and each UE may estimate an actual channel thereof, via which data is transmitted. The RS to which precoding is applied is the above-described DM-RS.

A CRS which is a cell-specific RS is generated based on cell ID. Accordingly, since TPs such as the RRHs and the macro eNB allocated the same cell ID transmit the same CRS, the TPs simultaneously transmit a PDCCH/PDSCH based on the CRS and a UE which receives the PDCCH/PDSCH recognizes the signals received from the TPs as one signal.

For uplink transmission power control, in the case in which a UE measures path loss based on a CRS as in the conventional method, path loss of a composite channel of CRSs transmitted by the TPs allocated the same cell ID is measured.

Even when a TP geographically located close to a specific UE is present such that uplink transmission power for actual uplink signal transmission can be further reduced, the uplink transmission with excessive uplink transmission power can cause interference to another node, that is, a TP. In particular, if UEs in a cell in which TPs allocated the same cell ID are present perform uplink multi-user MIMO transmission, etc., a measurement object which becomes an uplink transmission power control criterion may become ambiguous, thereby causing performance deterioration due to ineffective uplink transmission power control.

In order to solve this problem, in the present invention, different antenna ports for RSs are allocated to TPs, information such as RS setting information and downlink transmission power values of the antenna ports are provided to a UE in advance through higher layer signaling, a path loss value is estimated using the advance information and a measurement result, and uplink transmission power is determined using the estimated value.

That is, a specific CRS port or CSI-RS port set through higher layer signaling is used to determine uplink transmission power such that uplink transmission power of TPs allocated the same cell ID is efficiently controlled based on individual path loss estimation values.

More specifically, a method of signaling an antenna port for a CSI-RS transmitted from a TP closest to a specific UE and a downlink transmission power value of the port through a higher layer, for example, an RRC layer, and measuring path loss based on signaling may be considered.

Alternatively, a method of transmitting CRSs for antenna ports 0 and 1 for general radio resource management (RRM) measurement of a UE at all TPs and transmitting CRS for antenna ports 2 and 3 at different TPs so as to measure path loss of each TP may be considered. RRM measurement refers to received signal strength indicator (RSSI)/reference signal received power (RSRP)/reference signal received quality (RSRQ), path loss and interference measurement.

After antenna ports for a CSI-RS transmitted from TPs and downlink transmission power values of the antenna ports are transmitted through higher layer signaling, a UE may control uplink transmission power according to a TP with lowest path loss based on such advance information and a measurement result.

If uplink CoMP transmission is considered, after antenna ports for CSI-RSs transmitted from TPs and downlink transmission power values of the antenna ports are transmitted through higher layer signaling, a UE may select path loss estimation values of the TPs measured based on such advance information and a measurement result according to a specific function and control uplink transmission power.

The method of controlling uplink transmission power proposed by the present invention includes various modifications/applications which are implemented depending on how antenna ports for RSs are distributed to TPs or in which time/frequency resources measurement is performed. For example, a method of allocating different antenna ports to TPs allocated the same cell ID in the same subframe and then simultaneously transmitting RSs or a method of transmitting RSs defined by different antenna ports over a plurality of subframes may be implemented.

By performing measurement based on RSs defined by a plurality of antenna ports with respect to a specific TP, it is possible to perform channel measurement and channel status information feedback as well as path loss estimation.

Figure 10:
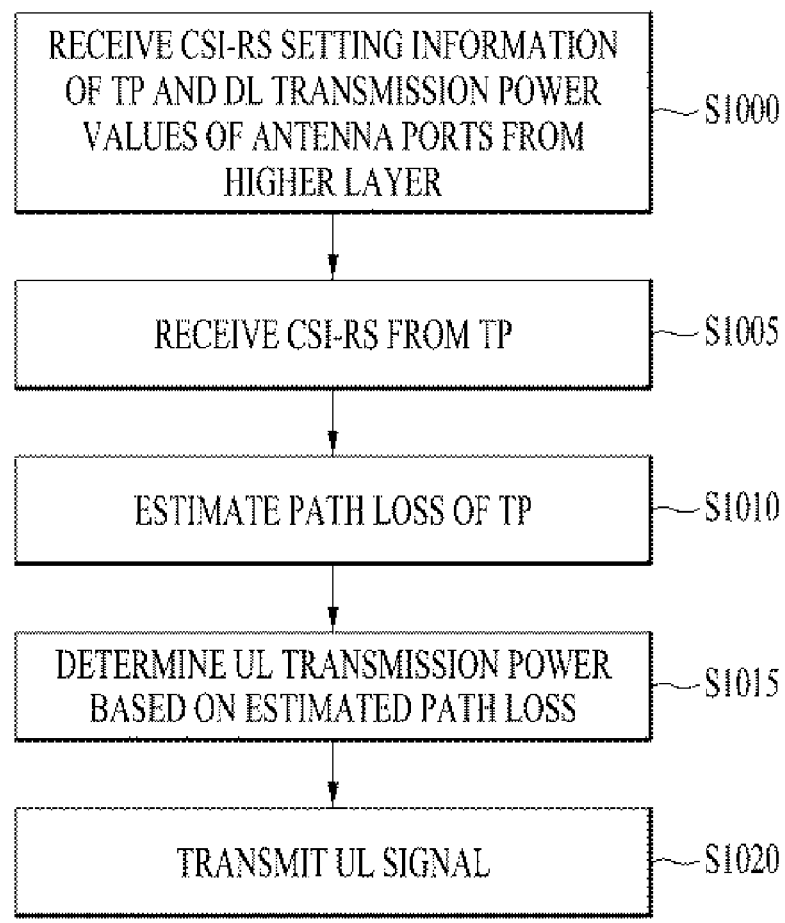
FIG. 10 is a flowchart illustrating a method of controlling uplink transmission power according to an embodiment of the present invention.

FIG. 10 is a flowchart illustrating a method of controlling uplink transmission power according to an embodiment of the present invention.

Referring to FIG. 10, first, a UE receives CSI-RS setting information of TPs and transmission power values of the TPs from a higher layer in step S1000. In particular, different antenna ports for CSI-RSs may be allocated to TPs and transmission power values corresponding to the antenna ports may be signaled. The CSI-RS setting information may include an indicator indicating whether the CSI-RS is used for RRM measurement as well as channel status information feedback.

Subsequently, the UE receives the CSI-RSs transmitted from TPs in step 1005 and estimates path loss using the received CSI-RSs in step S1010. The CSI-RS is generally used for channel status information feedback, but, in the present invention, may be used to determine uplink transmission power by RRM measurement and path loss estimation.

The UE determines uplink transmission power based on the estimated path loss in step 1015. More specifically, the UE may control uplink transmission power based on a TP with lowest path loss or apply path loss estimation values of all TPs to a specific function and control uplink transmission power based on an average of all the path loss estimation values.

Finally, the UE transmits an uplink signal to one or more TPs based on the determined uplink transmission power in step 1020.

Figure 11:
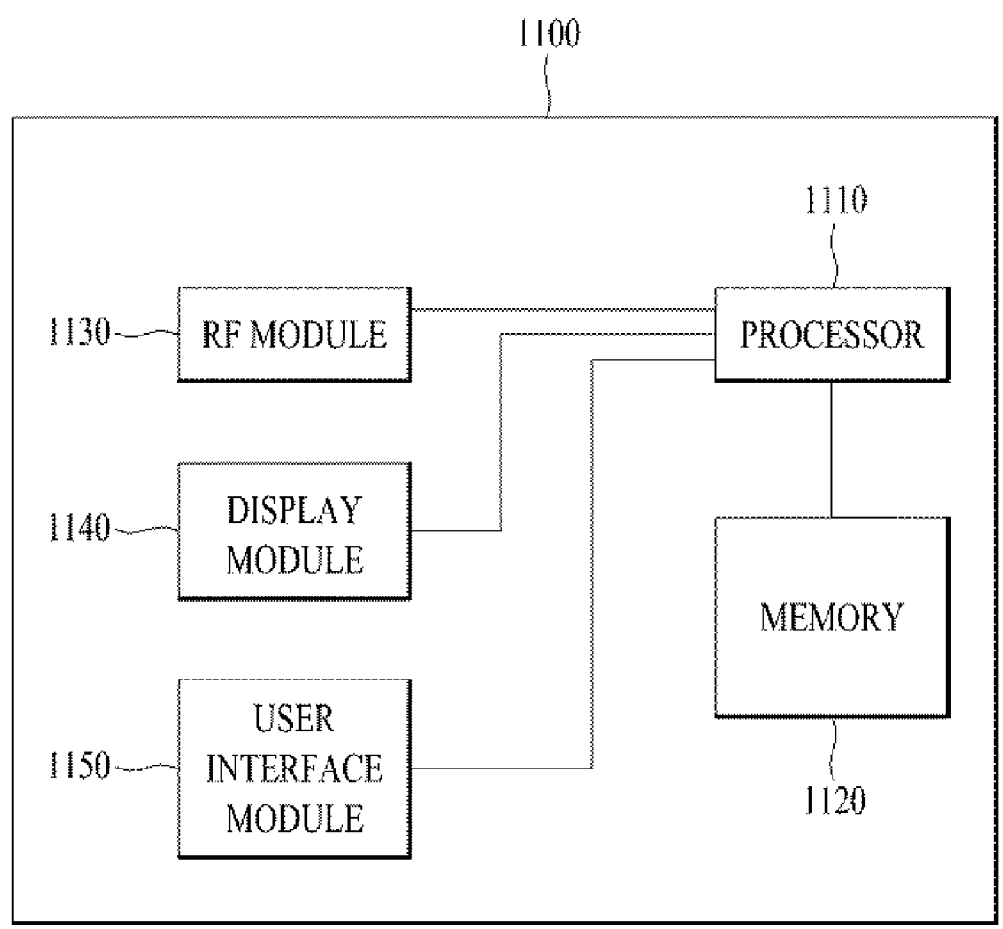
FIG. 11 is a block diagram showing the configuration of a communication apparatus according to an embodiment of the present invention.

FIG. 11 is a block diagram showing the configuration of a communication apparatus according to an embodiment of the present invention.

Referring to FIG. 11, a communication apparatus 1100 includes a processor 1110, a memory 1120, a radio frequency (RF) module 1130, a display module 1140 and a user interface module 1150.

The communication apparatus 1100 is shown for convenience of description and some modules thereof may be omitted. In addition, the communication apparatus 1100 may further include necessary modules. Some modules of the communication apparatus 1100 may be subdivided. The processor 1110 may be configured to perform the operation according to the embodiments of the present invention described with reference to the drawings. More specifically, for a detailed operation of the processor 1110, refer to the description of FIGS. 1 to 10.

The memory 1120 is connected to the processor 1110 so as to store an operating system, applications, program code, data, etc. The RF module 1130 is connected to the processor 1110 so as to convert a baseband signal into an RF signal or convert an RF signal into a baseband signal. For conversion, the RF module 1130 performs analog conversion, amplification, filtering and frequency up-conversion or inverse processes thereof. The display module 1140 is connected to the processor 1110 so as to display a variety of information. The display module 1140 may include, but is not limited to, well-known devices such as a liquid crystal display (LCD), a light emitting diode (LED), and an organic light emitting diode (OLED). The user interface module 1150 is connected to the processor 1110 and includes a combination of well-known user interfaces such as a keypad or a touchscreen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. Moreover, it will be apparent that some claims referring to specific claims may be combined with another claims referring to the other claims other than the specific claims to constitute the embodiment or add new claims by means of amendment after the application is filed.

Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes other than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Mode for the Invention

Various embodiments have been described in the best mode for carrying out the invention.

INDUSTRIAL APPLICABILITY

Although an example of applying a method of controlling uplink transmission power at a UE in a wireless communication system and an apparatus thereof to a 3GPP LTE system is described, the present invention is applicable to various wireless communication systems in addition to the 3GPP LTE system.

The invention claimed is:

1. A method of determining uplink transmission power at a user equipment (UE) in a wireless communication system, the method comprising:
receiving channel status information-reference signal (CSI-RS) settings and downlink transmission power values for a plurality of transmission points (TPs) from a higher layer;
receiving CSI-RSs from the plurality of TPs;
estimating path loss values corresponding to the plurality of TPs based on the received CSI-RSs;
determining the uplink transmission power using the estimated path loss values; and
transmitting an uplink signal to one or more of the plurality of TPs based upon the determined uplink transmission power,
wherein the CSI-RS settings include an indicator indicating whether the CSI-RSs are used for path loss value estimation in addition to channel status information feedback.

2. The method according to claim 1, wherein the CSI-RSs for the plurality of TPs are defined by different antenna ports.

3. The method according to claim 2, wherein the downlink transmission power values for the plurality of transmission points correspond to the defined antenna ports.

4. The method according to claim 1, wherein the determining the uplink transmission power includes determining the uplink transmission power according to a smallest path loss value among the estimated path loss values.

5. The method according to claim 1, wherein determining the uplink transmission power includes determining the uplink transmission power according to an average of the estimated path loss values.

6. The method according to claim 1, wherein the plurality of TPs have the same cell identifier.

7. The method according to claim 1, wherein the plurality of TPs transmits the same cell-specific RS to the UE.

8. A user equipment (UE) in a wireless communication system, comprising:
a reception module configured to receive channel status information-reference signal (CSI-RS) settings and downlink transmission power values for a plurality of transmission points (TPs) from a higher layer and receive CSI-RSs from the plurality of TPs;
a processor configured to estimate path loss values corresponding to the plurality of TPs based on the received CSI-RSs and determine uplink transmission power using the estimated path loss values; and
a transmission module configured to transmit an uplink signal to one or more of the plurality of TPs based upon the determined uplink transmission power,
wherein the CSI-RS settings include an indicator indicating whether the CSI-RSs are used for path loss value estimation in addition to channel status information feedback.

9. The UE according to claim 8, wherein the CSI-RSs for the plurality of TPs are defined by different antenna ports.

10. The UE according to claim 9, wherein the downlink transmission power values for the plurality of transmission points correspond to the defined antenna ports.

11. The UE according to claim 8, wherein the processor determines the uplink transmission power according to a smallest path loss value among the estimated path loss values.

12. The UE according to claim 8, wherein the processor determines the uplink transmission power according to an average of the estimated path loss values.

13. The UE according to claim 8, wherein the plurality of TPs have the same cell identifier.

14. The UE according to claim 8, wherein the plurality of TPs transmits the same cell-specific RS to the UE.

* * * * *